US011012408B2

(12) United States Patent
Sireling et al.

(10) Patent No.: US 11,012,408 B2
(45) Date of Patent: May 18, 2021

(54) CONFIGURING VIRTUAL MACHINE INSTANCES USING ONE-TO-ONE MAPPINGS (71) Applicant: International Business Machines Corporation, Armonk, NY (US)

(72) Inventors: Gideon Sireling, Jerusalem (IL); Simeon Gelband, Hashmonaim (IL)

(73) Assignee: International Business Machines Corporation, Armonk, NY (US)

( * ) Notice: Subject to any disclaimer, the term of this patent is extended or adjusted under 35 U.S.C. 154(b) by 169 days.

(21) Appl. No.: 16/108,117

(22) Filed: Aug. 22, 2018

(65) Prior Publication Data
US 2020/0067876 A1  Feb. 27, 2020

(51) Int. Cl.
H04L 29/12 (2006.01)
G06F 9/455 (2018.01)
H04L 12/741 (2013.01)

(52) U.S. Cl.
CPC ...... H04L 61/6022 (2013.01); G06F 9/45558 (2013.01); H04L 45/745 (2013.01); H04L 61/2015 (2013.01); G06F 2009/45595 (2013.01)

(58) Field of Classification Search
CPC .............. G06F 2009/45595; H04L 45/745
See application file for complete search history.

(56) References Cited

U.S. PATENT DOCUMENTS

| | | | |
|---|---|---|---|
| 8,363,656 B2 | 1/2013 | Klink | |
| 9,027,087 B2 * | 5/2015 | Ishaya | G06F 9/45558 726/4 |
| 9,203,775 B2 | 12/2015 | Mulligan | |
| 9,430,255 B1 * | 8/2016 | Beda, III | G06F 9/45558 |
| 9,535,798 B1 * | 1/2017 | Liguori | G06F 11/1469 |
| 10,382,401 B1 * | 8/2019 | Lee | H04L 12/4633 |
| 2010/0257269 A1 * | 10/2010 | Clark | G06F 9/5083 709/226 |
| 2012/0066509 A1 * | 3/2012 | Lapp | G06F 21/6218 713/189 |
| 2013/0298228 A1 * | 11/2013 | Smith | H04L 63/0414 726/22 |
| 2014/0282889 A1 * | 9/2014 | Ishaya | H04L 63/0876 726/4 |
| 2016/0105312 A1 | 4/2016 | Edwards | |
| 2016/0344586 A1 | 11/2016 | Ganichev | |
| 2017/0300354 A1 | 10/2017 | Dalal | |

OTHER PUBLICATIONS

"Port Forwarding", Wikipedia, This page was last edited on May 11, 2018, at 22:21, <https://en.wikipedia.org/wiki/Port_forwarding>, 5 pages.

* cited by examiner

*Primary Examiner* — Fahmida S Chowdhury
(74) *Attorney, Agent, or Firm* — Stephen R. Yoder; David B. Woycechowsky (57) ABSTRACT

A virtual machine (VM) instance is generated based on a received template. The VM instance is assigned a MAC address from the pool of MAC addresses and an IP address based on the MAC address of the VM instance. A routing identifier of the routing identifiers is extracted from the assigned IP address or the assigned MAC address. Software of the VM is configured to receive data using a port number corresponding to the extracted routing identifier based on a one-to-one mapping.

15 Claims, 6 Drawing Sheets

CONFIGURING VIRTUAL MACHINE INSTANCES USING ONE-TO-ONE MAPPINGS

BACKGROUND

The present techniques relate to configuring virtual machine instances using routing identifiers and port numbers.

In computer network communications, a "port" is generally understood as an endpoint for computer-based communications. In computer network communications, ports can exist either in hardware or software. In software, a port is a logical construct that identifies a particular process or a particular type of network service. The software port is typically associated with an IP address of a host and the protocol type of the communication, although it is noted that many ports can handle multiple different protocols. When ports are assigned identifiers (such as identification numbers), these identifiers are referred to as "port numbers."

In computer network communications, a routing identifier is generally understood to be a record of a route path for data that is communicated from one terminal point (such as a "port") to another terminal point.

A media access control address (MAC address) of a device is a unique identifier assigned to a network interface controller (NIC) for communications at the data link layer of a network segment. MAC addresses are used as a network address for most IEEE 802 network technologies, including Ethernet and Wi-Fi. In this context, MAC addresses are used in the medium access control protocol sublayer. A MAC may be referred to as the burned-in address (BIA). It may also be known as an Ethernet hardware address (EHA), hardware address or physical address (not to be confused with a memory physical address). A network node may have multiple NICs and each NIC must have a unique MAC address. Sophisticated network equipment such as a multilayer switch or router may require one or more permanently assigned MAC addresses. MAC addresses are most often assigned by the manufacturer of a NIC and are stored in its hardware, such as the card's read-only memory or some other firmware mechanism. A MAC address may include the manufacturer's organizationally unique identifier (OUI). MAC addresses are typically formed according to the rules of one of three numbering name spaces managed by the Institute of Electrical and Electronics Engineers (IEEE): EUI-48 (it replaces the obsolete term MAC-48) and EUI-64. EUI is an abbreviation for Extended Unique Identifier.

An Internet Protocol address (IP address) is a numerical label assigned to each device connected to a computer network that uses the Internet Protocol for communication. An IP address serves two principal functions: host or network interface identification and location addressing. Internet Protocol version 4 (IPv4) defines an IP address as a 32-bit number. IP addresses are usually written and displayed in human-readable notations, such as 172.16.254.1 in IPv4, and 2001:db8:0:1234:0:567:8:1 in IPv6. The size of the routing prefix of the address is designated in CIDR notation by suffixing the address with the number of significant bits, for example, 192.168.1.15/24, which is equivalent to the historically used subnet mask 255.255.255.0.

The IP address space is managed globally by the Internet Assigned Numbers Authority (IANA), and by five regional Internet registries (RIRs) responsible in their designated territories for assignment to end users and local Internet registries, such as Internet service providers.

SUMMARY

According to an embodiment described herein, a system can include processor to generate a virtual machine (VM) instance based on a received template. The processor can also further assign the VM instance a MAC address from a pool of MAC addresses and an IP address based on the MAC address of the VM instance. The processor can also extract a routing identifier from the assigned IP address or the assigned MAC address. The processor can also further configure software of the VM instance to receive data using a port number corresponding to the extracted routing identifier based on a one-to-one mapping.

According to another embodiment described herein, a method can include generating, via the processor, a virtual machine (VM) instance based on a received template. The method can further include assigning, via the processor, the VM instance a MAC address from a pool of MAC addresses and an IP address based on the MAC address of the VM instance. The method can also further include extracting, via the processor, a routing identifier from the assigned IP address or the assigned MAC address. The method can also include configuring, via the processor, software of the VM to receive data using a port number corresponding to the extracted routing identifier based on a one-to-one mapping.

According to another embodiment described herein, a computer program product can include computer-readable storage medium having program code embodied therewith. The computer readable storage medium is not a transitory signal per se. The program code executable by a processor to cause the processor to generate a virtual machine (VM) instance based on a received template. The program code can also cause the processor to assign the VM instance a MAC address from a pool of MAC addresses and an IP address based on the MAC address of the VM instance. The program code can also cause the processor to extract a routing identifier from the assigned IP address or the assigned MAC address. The program code can also cause the processor to configure software of the VM instance to receive data using a port number corresponding to the extracted routing identifier based on a one-to-one mapping.

According to an embodiment of the present invention, there is a method, computer program product and/or computer system that performs the following operations (not necessarily in the following order): (i) receiving a set of template(s); (ii) generating a plurality of virtual machine instances (VMIs) respectively based on a template of the set of templates; (iii) for each given VMI of the plurality of VMIs: (a) assigning the given VMI a respectively corresponding media access control (MAC) address, (b) assigning the given VMI a respectively corresponding IP address based, at least in part, upon its MAC address, (c) extracting a routing identifier respectively corresponding to the given VMI, with the routing identifier of the given VMI being extracted from at least one of the following sources: the MAC address of the given VMI and/or the IP address of the given VMI, and with the extraction of the routing identifiers creating a one-to-one mapping scheme between the routing identifiers of the VMIs and the VMIs such that: no VMIs of the plurality of VMIs have the same routing identifier, and no routing identifier corresponds to more than one VMI of the plurality of VMIs, and (d) configuring software of the given VMI to receive data using a port number corresponding to its routing identifier extracted under the one-to-one mapping scheme; and/or (iv) receiving a plurality of communications, with each communication of the plurality of communications being received respectively by a recipient VMI of the plurality of VMIs, and with each given communication of the plurality of communications using the port number of the recipient VMI of the given communication.

DETAILED DESCRIPTION

Software as a Service ("SaaS") and other cloud scenarios may use many identical virtual machines (VMs) that are rapidly deployed with minimum overhead. These VMs may also be addressable from the Internet. However, simply allowing each VM to have its own publicly addressable domain, or even its own subdomain, is prohibitively expensive. In some examples, a single domain for all the VMs, with one digital certificate and one common external Internet Protocol (IP) address for the VMs, may be obtained using an internal network with IP addresses assigned using dynamic routing tables in which VM templates include client agents that are managed by queries from a management agent. However, these techniques may result in frequently updating large routing tables that places excessive load on the routers and management agents. Moreover, the fragile nature of numerous ad-hoc routing rules for ephemeral virtual machines increases the likelihood of failure in the network layer, and such a failure would be difficult to diagnose. In addition, some bi-directional client-server software does not operate correctly when the external port is mapped to a different internal port. Furthermore, the virtual machines in the above examples may bear the overhead of a constantly running agent. More specifically, an agent software must be maintained for each operating system used by the various VM templates. Moreover, the process may fail if any client agent terminates.

According to techniques described herein, when a virtual machine instance is generated, the virtual machine instance can be configured based on a one-to-one mapping. For example, a static routing table used to map routing identifiers to a pool of Internet Protocol (IP) addresses and a pool of media access control (MAC) addresses may be generated based on a one-to-one mapping. A virtual machine (VM) instance may be generated based on a received template. The VM instance may be assigned a MAC address from a pool of MAC addresses and an IP address based on the MAC address of the VM instance. A routing identifier may be extracted from the assigned IP address or the assigned MAC address. Software of the VM may then be configured to send and receive data using a port number corresponding to the extracted routing identifier based on the one-to-one mapping. In response to receiving traffic at a common external IP address of the virtual network, a router may detect the assigned IP address for the traffic based on the static routing table and forward the traffic to the VM instance. In response to receiving outbound traffic to be dispatched from the virtual network, the router may replace the assigned IP address in the outbound traffic with an external IP address of the virtual network and dispatch the outbound traffic from a port on which the outbound traffic is received.

The techniques described herein may thus reliably enable a dynamic pool of virtual machines to be exposed to the Internet, sharing a single domain and digital certificate, without the use of client agents or dynamic routing tables. In particular, by using static tables and a known mapping algorithm, the techniques described herein do not require any software to be continuously running inside the virtual machine. No maintenance of a routing table may be performed as the routing table is predefined and static. Thus, the techniques described herein thereby ensure routing resilience while reducing load on routers. In addition, the techniques described herein thereby allow virtual networks to scale to a greater number of virtual machines. Finally, investigating networking issues becomes much easier using the techniques described herein due to the deterministic nature of the MAC addresses and associated IP addresses and port numbers assigned for each VM instance. For example, given any one of a MAC address, an IP address, or a port number, the other two of the three may be determined for any given VM instance.

In some scenarios, the techniques described herein may be implemented in a cloud computing environment. As discussed in more detail below in reference to at least FIGS. 3-5, a computing device configured to automatically configure virtual machine instances using static routing tables may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (for example, mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
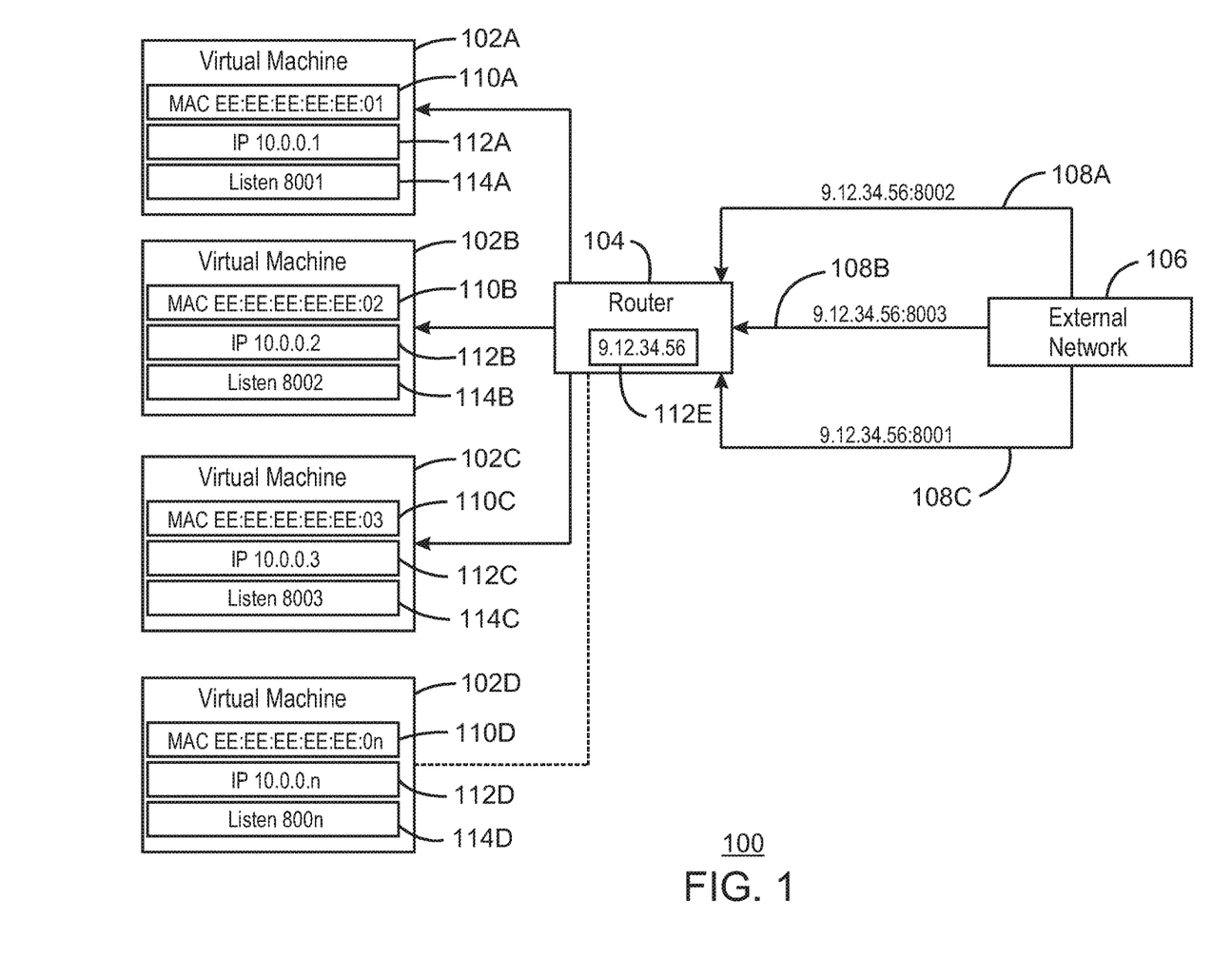
FIG. 1 is a block diagram of an example system including automatically configuring virtual machine instances using a one-to-one mapping.

With reference now to FIG. 1, a block diagram shows an example system including automatically configuring virtual machine instances using a one-to-one mapping. The example system is generally referred to by the reference number 100 and may be configured using the method 200 of FIG. 2 below. FIG. 1 includes a set of virtual machine instances 102A-102D communicatively coupled to a router 104. The router 104 is communicatively coupled to an external network 106. The router 104 is shown receiving traffic 108A-108C from the external network 106. The virtual machine instances 102A-102D include media access control (MAC) addresses 110A-110D, Internet Protocol (IP) addresses 112A-112D, and port numbers 114A-114D, respectively. Together, the virtual machines 102A-102D and the router 104 may form a virtual network sharing one common external IP address. For example, the IP address 112E of the virtual network in the example system 100 is 9.12.34.56. The router 104 may include a static routing table mapping a pool of internal IP addresses to respective port numbers 114A-114D. In some examples, the virtual network may also include a DHCP server (not shown). For example, the DHCP server may be included in the router 104. The DHCP server may have a static routing table (not shown) mapping a MAC address pool to an internal IP address pool.

In the example of FIG. 1, a one-to-one mapping is used to configure virtual machine instances 102A-102D and a static routing table in router 104. In the example system 100, the one-to-one mapping used is a bitmask. As used herein, a bitmask identifies a subset of bits to be extracted from a larger bit-sequence. For example, the subset of bits may correspond to a routing identifier. As shown in virtual machine 102D, the bitmask used in system 100 is based on the last digit suffix of each of the MAC addresses, IP addresses, and port numbers. The IP addresses may be 32-bit numbers or 128 bit numbers, or any other suitable number of bits. The port numbers may be 16-bit unsigned numbers. The MAC addresses in a pool may be in the form EE:EE:EE:EE:EE:XX, the IP addresses may be in the form 10.0.0.XX, and the port numbers may be 80XX, where XX indicates a variable routing identifier number. The MAC addresses in a pool may thus include a static prefix and a randomly assigned suffix. The virtual machine instances 102A-102D may have been configured using the method 200 as described in greater detail with regards to FIG. 2 below. Thus, virtual machine instance 102A may have been assigned a MAC address of EE:EE:EE:EE:EE:01 and therefore be associated with a routing identifier of "1." The VM instance 102A may be assigned an IP address of 10.0.0.1 based on the MAC address. The VM instance may be assigned a port of 8001 based on the IP address or the MAC address. For example, a routing identifier may be extracted from either the MAC address or the IP address and used to generate the port number to be used for the VM instance. VM instances 102B-102D may be similarly configured using respective routing identifiers.

Still referring to FIG. 1, the router 104 may include a static routing table that maps routing identifiers to corresponding MAC addresses, IP addresses, and port numbers, based on a one-to-one mapping. Thus, the static routing table may include sets of routing identifiers with corresponding MAC addresses, IP addresses, and port numbers with similar digits according to a bitmask. The router 104 has an external IP address of 9.12.34.56 and thus may receive traffic 108A-108C at that IP address with different port numbers 8002, 8003, and 8001 for traffic 108A-108C, respectively. The router 104 may check the static routing table for internal IP addresses corresponding to the VM instances to forward the traffic. For example, traffic 108A may be forwarded to VM instance 102B associated with port 8002. Traffic 108B may be forwarded to VM instance 103C associated with port 8003. Similarly, traffic 108C may be forwarded to VM instance 102A associated with port 8001.

When receiving outgoing traffic (not shown), the router 104 may replace the original internal IP address associated with the originating VM instance with its IP of 9.12.34.56. However, the router 104 may keep the original port address associated with the originating VM instance. Thus, for traffic received from VM instance 102A, the outgoing traffic to external network 106 may have an originating IP address of 9.12.34.56:8001. Similarly, outgoing traffic from VM instances 102B-102D may have an originating IP address from the router 104 of 9.12.34.56:8002, 9.12.34.56:8003, and 9.12.34.56:800n.

In some examples, a user may thus request a virtual machine instance from a template. Using the techniques described herein, the management software may create a VM from a selected template and inform the user of the IP address and port number combination through which the VM instance can be accessed. The user may then able to access the software of the VM instance through the IP address or port number without any manual configuration.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional virtual machine instances, or MAC addresses, IP addresses, port numbers, bitmasks, routers, traffic, external networks, etc.).

Figure 2:
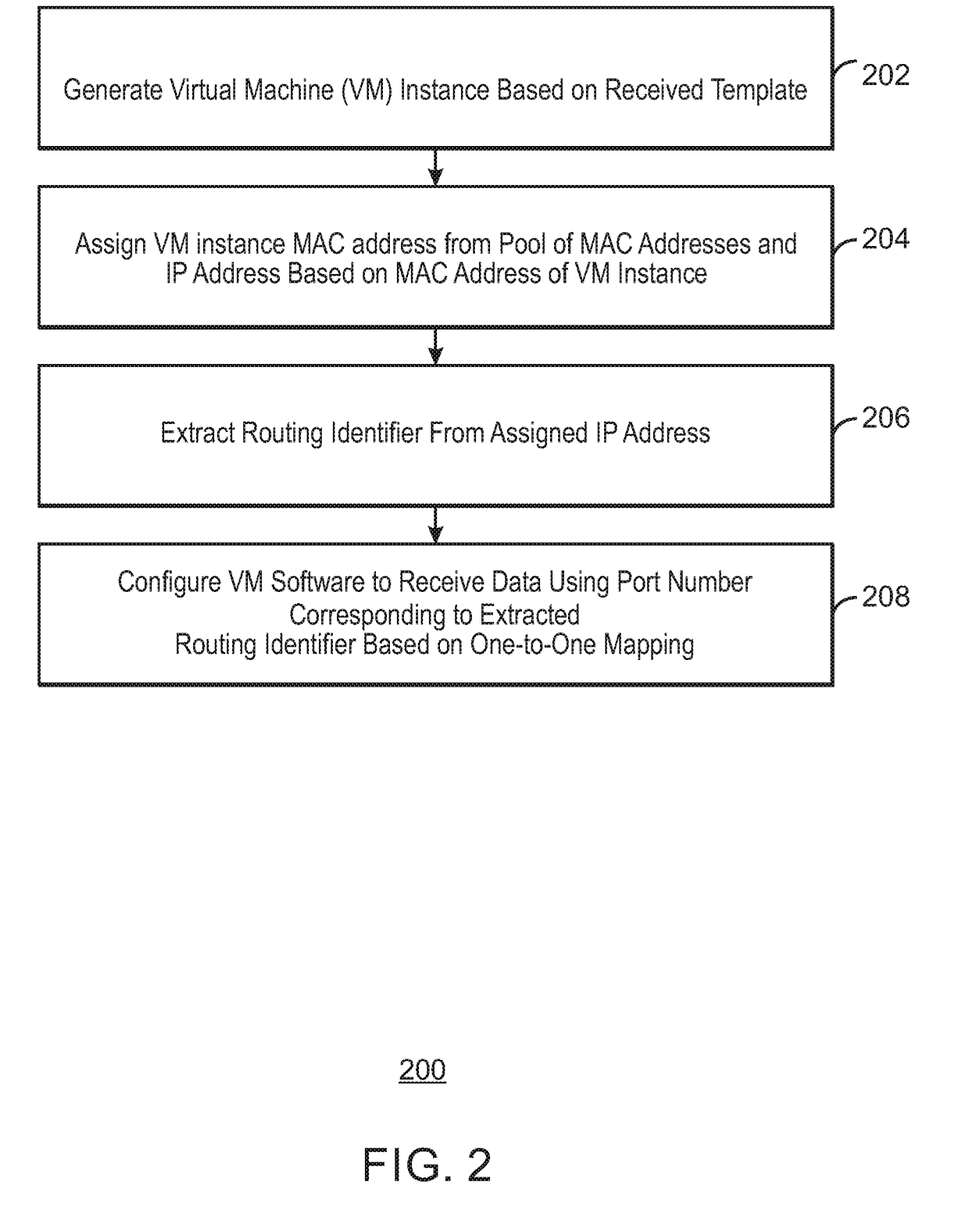
FIG. 2 is a block diagram of a method for configuring virtual machine instances using a one-to-one mapping.

FIG. 2 is a process flow diagram of an example method that can configure virtual machine instances using a one-to-one mapping. The method 200 can be implemented with any suitable computing device, such as the computing device 300 of FIG. 3. For example, the methods described below can be implemented by the processor 302 of FIG. 3 or the processor 602 of FIG. 6.

At block 202, a virtual machine (VM) instance is generated based on a received template. For example, the template may include all particular services to be included in a VM instance, such as a web server or a mail server. In some examples, the template may also include a start-up script as described below. The template may be selected from a number of available predefined templates.

At block 204, the VM instance is assigned a MAC address from a pool of MAC addresses and an IP address based on the MAC address of the VM instance. The MAC address may be from a pool of MAC addresses and the IP address may be from a pool of IP addresses. The VM instance may be connected to a virtual network including a static routing table. The static routing table may map routing identifiers to the pool of Internet Protocol (IP) addresses and the pool of media access control (MAC) addresses based on the one-to-one mapping. The static routing table may include a list of routing identifiers, and corresponding MAC addresses, IP address, and port numbers, or any combination thereof. For example, the static routing table may be generated and stored on a router. In some examples, the VM instance may be connected to the virtual network after being assigned the MAC address. The VM instance may request an IP address from a Dynamic Host Configuration Protocol (DHCP) server after booting. The DHCP server may assign the VM instance an IP address based on the MAC address. In some examples, the VM instance may alternatively be assigned a static IP address by a start-up script. For example, the start-up script may be injected into the VM instance by a virtual machine manager as part of an initialization process. In some examples, the start-up script may assign the VM instance the IP address in response to detecting a lack of a marker indicating that networking of a VM instance has been configured. For example, the marker may be set once networking for the VM instance has been configured, as described below. The start-up script may edit a host file of the VM instance to point the host name of the VM instance to the assigned IP address. The host file may thus include mapping between a host name of the VM and the assigned IP address. In some examples, the assigned IP address may be assigned by a DHCP (that is, DHCP server) or can be assigned by the start-up scripts based on the assigned MAC address of the given VM instance.

At block 206, a routing identifier of the routing identifiers is extracted from the assigned IP address or the assigned MAC address. A routing identifier, as used herein, may be any number used to identify an association between a MAC address, an IP address, and a port number. For example, the routing identifier may be extracted by the start-up script using the one-to-one mapping.

At block 208, software of the VM instance is configured to receive data using a port number corresponding to the extracted routing identifier based on a one-to-one mapping. For example, the software may include a web server, a file server, or any other software that may be running on the VM instance. In some examples, a marker may be set indicating that networking of a VM instance has been configured in response to configuring the software of the VM. The VM instance may then send out traffic using the configured port number to be sent out to an external network via a router. The VM instance may also send traffic from the router based on its respective port number. In some examples, the router may use a static routing table to look up the IP address of the destination VM instance based on the port number in received external traffic. Therefore, external requests may be automatically routed to ephemeral virtual machines without the use of any client agents or updating any of the static routing tables. In some examples, no routing table may be used. For example, the router may calculate routes on the fly from the one-to-one mapping.

As one example, a virtual machine manager may receive a request to create a VM from a specific template and attach it to a virtual network. For example, the request may be received through a user interface (UI) or application programming interface (API) of the virtual machine manager. A virtual network may have a router facing the Internet with a pre-computed routing table. The routing table may contain a list of all internal IP addresses in the pool, and their corresponding ports. To calculate a port, a program which computes the table may take the last byte of the IP address, and add 8000 to the last byte. For example, 10.0.0.1 may map to port 8001. The virtual network may be assigned a pool of MAC addresses. For example, the pool of MAC address may be the range EE:EE:EE:EE:EE:01-EE:EE:EE:EE:EE:FE. The VM template may contain a web server. For example, the web server may be used by a sales agent for demonstrating a product or service to customers. When the VM manager creates the VM instance, the VM manager may assign the VM instance a random MAC address EE:EE:EE:EE:EE:01 from the pool. When the VM instance starts up, a configuration script injected by the VM manager may extract the last byte from the MAC address, and thereby detect that the VM should use IP 10.0.0.1 and port 8001. The configuration script may then configure the OS and other software in the VM instance to use the correct IP address. The configuration script may also configure the server to listen on port 8001. When data is received from the Internet on port 8001, the router looks up this port in its routing table and sends it to the IP address 10.0.0.1. The sales agent can point his web browser to the router's external IP (the same external IP for all VM instances in this network), and port 8001. The agent's session may be secured by an SSL certificate applied to the external IP, which may be shared by every VM instance on the network.

The process flow diagram of FIG. 2 is not intended to indicate that the operations of the method 200 are to be executed in any particular order, or that all of the operations of the method 200 are to be included in every case. Additionally, the method 200 can include any suitable number of additional operations. For example, the method 200 may include, in response to receiving traffic at a common external IP address of the virtual network at a router, detecting the assigned IP address for the traffic based on the static routing table and forwarding the traffic to the VM instance. The method 200 may also include, in response to receiving outbound traffic from the VM instance to be dispatched from the virtual network at a router, replacing the assigned IP address in the outbound traffic with an external IP address of the virtual network and dispatching the outbound traffic from a port on which the outbound traffic is received.

Figure 3:
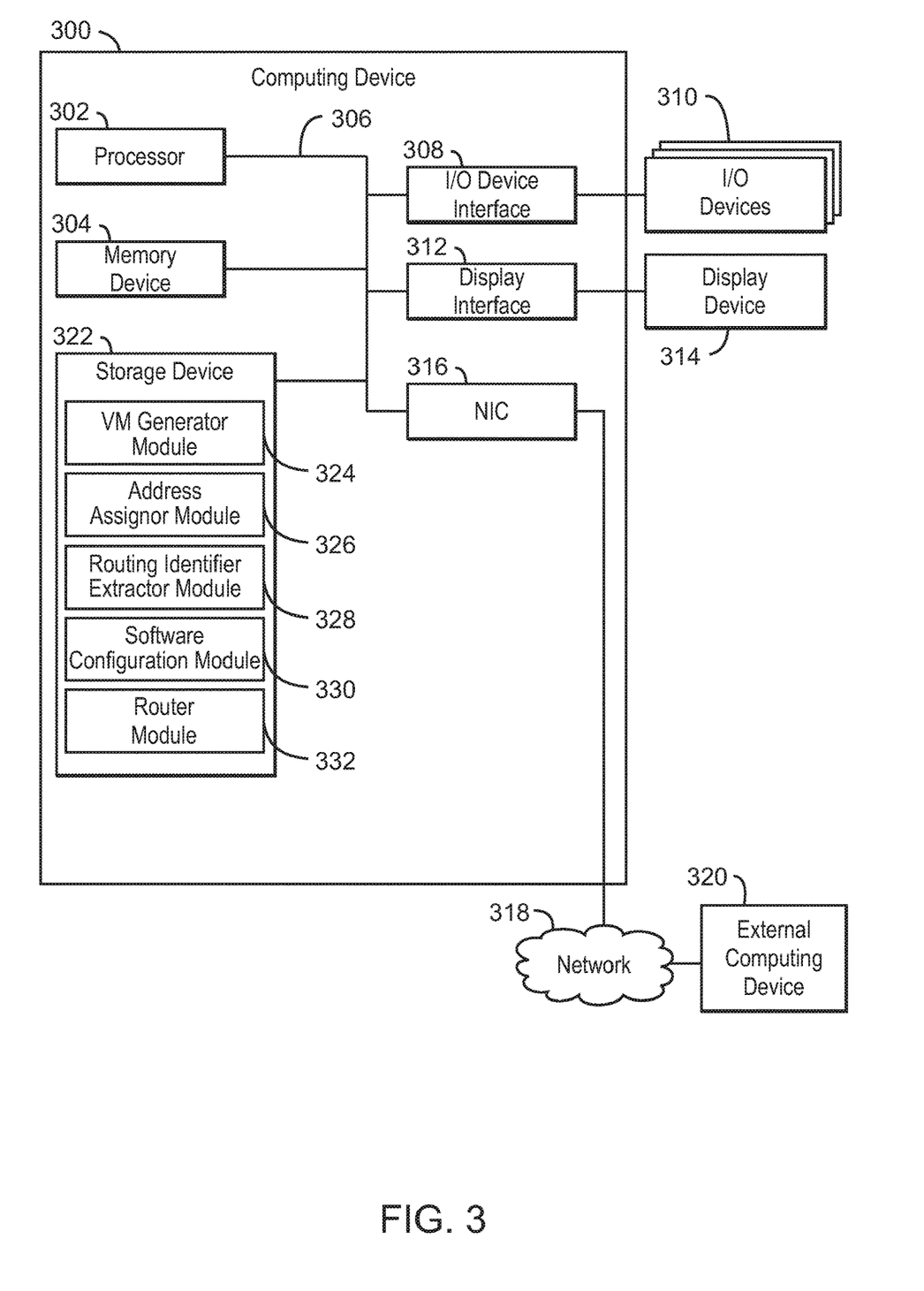
FIG. 3 is a block diagram of a computing device for configuring virtual machine instances using a one-to-one mapping.

FIG. 3 is block diagram of an example computing device that can configure virtual machine instances using a one-to-one mapping. The computing device 300 may be for example, a server, desktop computer, laptop computer, tablet computer, or a router. In some examples, computing device 300 may be a cloud computing node. Computing device 300 may be described in the general context of computer system executable instructions, such as program modules, being executed by a computer system. Generally, program modules may include routines, programs, objects, components, logic, data structures, and so on that perform particular tasks or implement particular abstract data types. Computing device 300 may be practiced in distributed cloud computing environments where tasks are performed by remote processing devices that are linked through a communications network. In a distributed cloud computing environment, program modules may be located in both local and remote computer system storage media including memory storage devices.

The computing device 300 may include a processor 302 that is to execute stored instructions, a memory device 304 to provide temporary memory space for operations of said instructions during operation. The processor can be a single-core processor, multi-core processor, computing cluster, or any number of other configurations. The memory 304 can include random access memory (RAM), read only memory, flash memory, or any other suitable memory systems.

The processor 302 may be connected through a system interconnect 306 (e.g., PCI®, PCI-Express®, etc.) to an input/output (I/O) device interface 308 adapted to connect the computing device 300 to one or more I/O devices 310. The I/O devices 310 may include, for example, a keyboard and a pointing device, wherein the pointing device may include a touchpad or a touchscreen, among others. The I/O devices 310 may be built-in components of the computing device 300 or may be devices that are externally connected to the computing device 300.

The processor 302 may also be linked through the system interconnect 306 to a display interface 312 adapted to connect the computing device 300 to a display device 314. The display device 314 may include a display screen that is a built-in component of the computing device 300. The display device 314 may also include a computer monitor, television, or projector, among others, that is externally connected to the computing device 300. In addition, a network interface controller (NIC) 316 may be adapted to connect the computing device 300 through the system interconnect 306 to the network 318. In some embodiments, the NIC 316 can transmit data using any suitable interface or protocol, such as the Internet small computer system interface, among others. The network 318 may be a cellular network, a radio network, a wide area network (WAN), a local area network (LAN), or the Internet, among others. An external computing device 320 may connect to the computing device 300 through the network 318. In some examples, external computing device 320 may be an external web-server 320. In some examples, external computing device 320 may be a cloud computing node.

The processor 302 may also be linked through the system interconnect 306 to a storage device 322 that can include a hard drive, an optical drive, a USB flash drive, an array of drives, or any combinations thereof. In some examples, the storage device may include a virtual machine (VM) generator module 324, an address assignor module 326, a routing identifier extractor module 328, a software configuration module 330, and a router module 332. The VM generator module 324 can generate a virtual machine (VM) instance based on a received template. The VM generator module 324 may also connect the VM instance to a virtual network including a common external IP address and a router. In some examples, the router may also include a DHCP server. The address assignor module 326 can assign the VM instance a MAC address from a pool of MAC addresses. The address assignor module 326 can also assign an IP address based on the MAC address of the VM instance. In some examples, the IP address may be assigned by a DHCP server. For example, the DHCP server may include a static routing table that maps MAC addresses to corresponding IP addresses. The routing identifier extractor module 328 may extract a routing identifier from the assigned IP address or the assigned MAC address. For example, the routing identifier may be extracted based on a one-to-one mapping, such as a bitmask. The software configuration module 330 may configure software of the VM instance to receive data using a port number corresponding to the extracted routing identifier based on a one-to-one mapping. The router module 332 may detect the assigned IP address for the traffic based on a static routing table in response to receiving the traffic at an external IP address of the virtual network and forwarding the traffic to the VM instance. The static routing table may map routing identifiers to a pool of Internet Protocol (IP) addresses and a pool of media access control (MAC) addresses based on a one-to-one mapping. In some examples, the one-to-one mapping may be a bitmask. The software configuration module 330 may also configure software of the VM instance to send data using a port number corresponding to the extracted routing identifier based on a one-to-one mapping. The router module 332 may also replace a source IP address including the IP address of the VM instance with an external IP address of the virtual network in response to receiving outbound traffic to be dispatched from the virtual network and dispatching the outbound traffic from a port on which the outbound traffic is received.

It is to be understood that the block diagram of FIG. 3 is not intended to indicate that the computing device 300 is to include all of the components shown in FIG. 3. Rather, the computing device 300 can include fewer or additional components not illustrated in FIG. 3 (e.g., additional memory components, embedded controllers, modules, additional network interfaces, etc.). Furthermore, any of the functionalities of the VM generator module 324, the address assignor module 326, the routing identifier extractor module 328, the software configuration module 330, and the router module 332, may be partially, or entirely, implemented in hardware and/or in the processor 302. For example, the functionality may be implemented with an application specific integrated circuit, logic implemented in an embedded controller, or in logic implemented in the processor 302, among others. In some embodiments, the functionalities of the VM generator module 324, the address assignor module 326, the routing identifier extractor module 328, the software configuration module 330, and the router module 332 can be implemented with logic, wherein the logic, as referred to herein, can include any suitable hardware (e.g., a processor, among others), software (e.g., an application, among others), firmware, or any suitable combination of hardware, software, and firmware.

Figure 4:
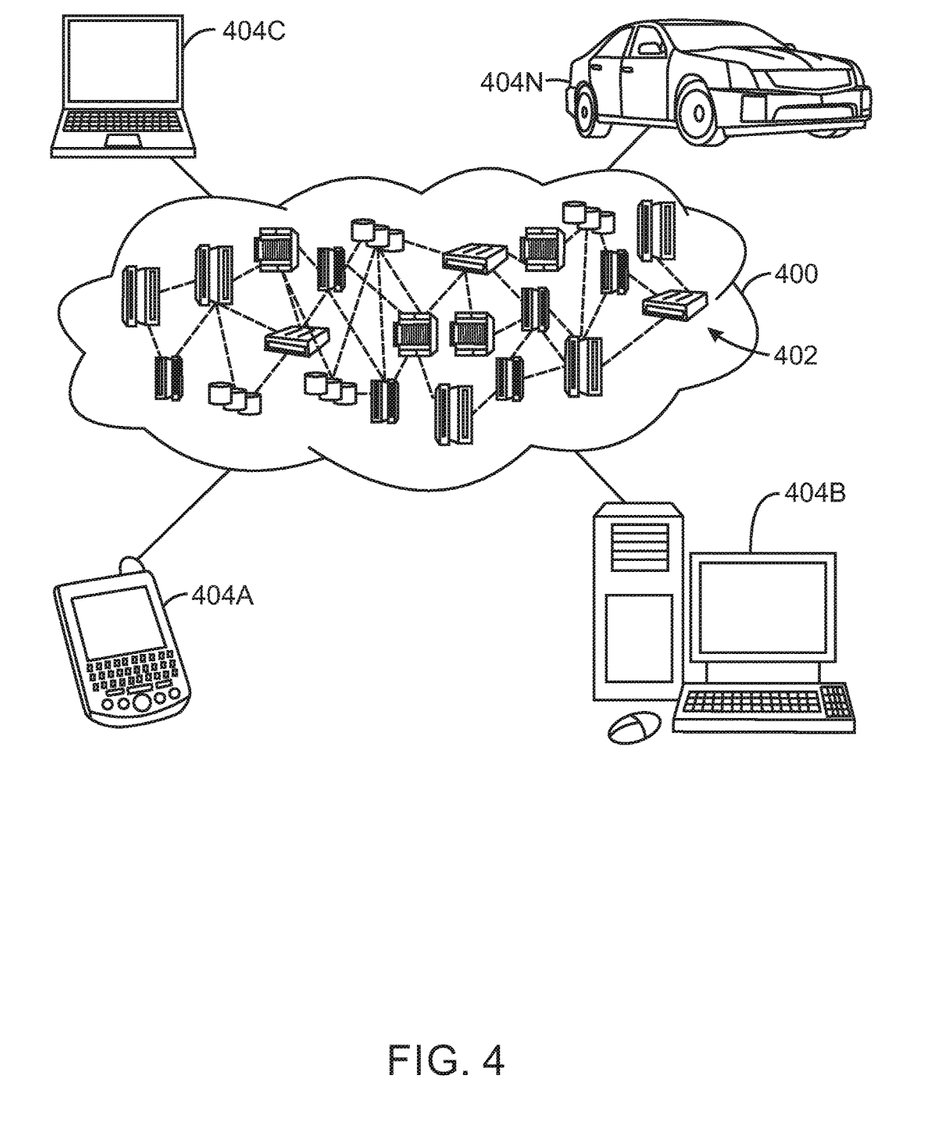
FIG. 4 is a process flow diagram of an example cloud computing environment according to embodiments described herein.

Referring now to FIG. 4, illustrative cloud computing environment 400 is depicted. As shown, cloud computing environment 400 comprises one or more cloud computing nodes 402 with which local computing devices used by cloud consumers, such as, for example, personal digital assistant (PDA) or cellular telephone 404A, desktop computer 404B, laptop computer 404C, and/or automobile computer system 404N may communicate. Nodes 402 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 404A-N shown in FIG. 4 are intended to be illustrative only and that computing nodes 402 and cloud computing environment 400 can communicate with any type of computerized device over any type of network and/or network addressable connection (e.g., using a web browser).

Figure 5:
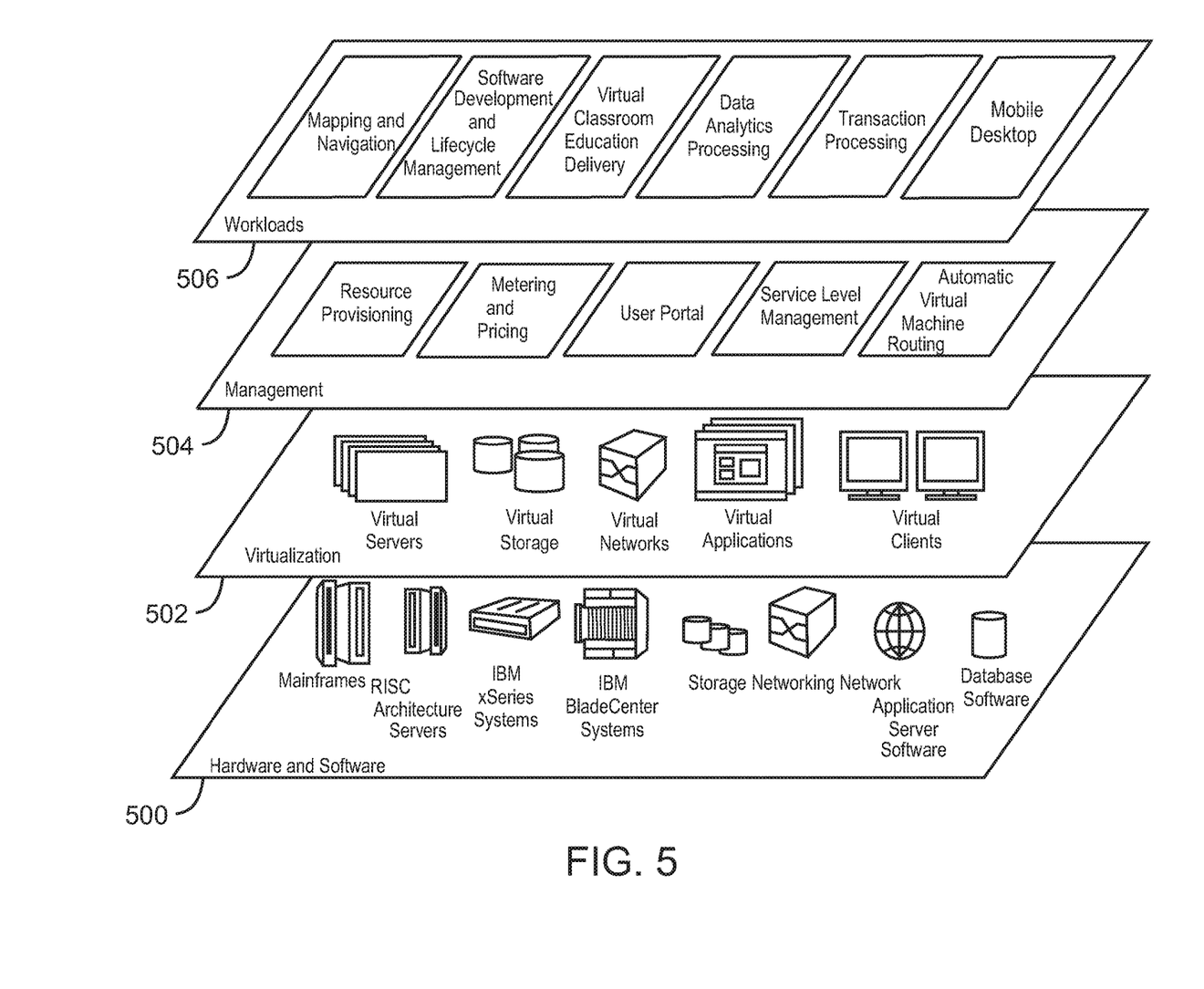
FIG. 5 is a process flow diagram of an example abstraction model layers according to embodiments described herein.

Referring now to FIG. 5, a set of functional abstraction layers provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided.

Hardware and software layer 500 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 502 provides an abstraction layer from which the following examples of virtual entities may be provided: virtual servers; virtual storage; virtual networks, including virtual private networks; virtual applications and operating systems; and virtual clients. In one example, management layer 504 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment (not shown) provides pre-arrangement for, and procurement of, cloud computing resources for which a future requirement is anticipated in accordance with an SLA. Automatic virtual machine routing provides automated provision and management of virtual networks for virtual machine instances.

Workloads layer 506 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

The present techniques may be a system, a method or computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present techniques may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present techniques.

Aspects of the present techniques are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 6:
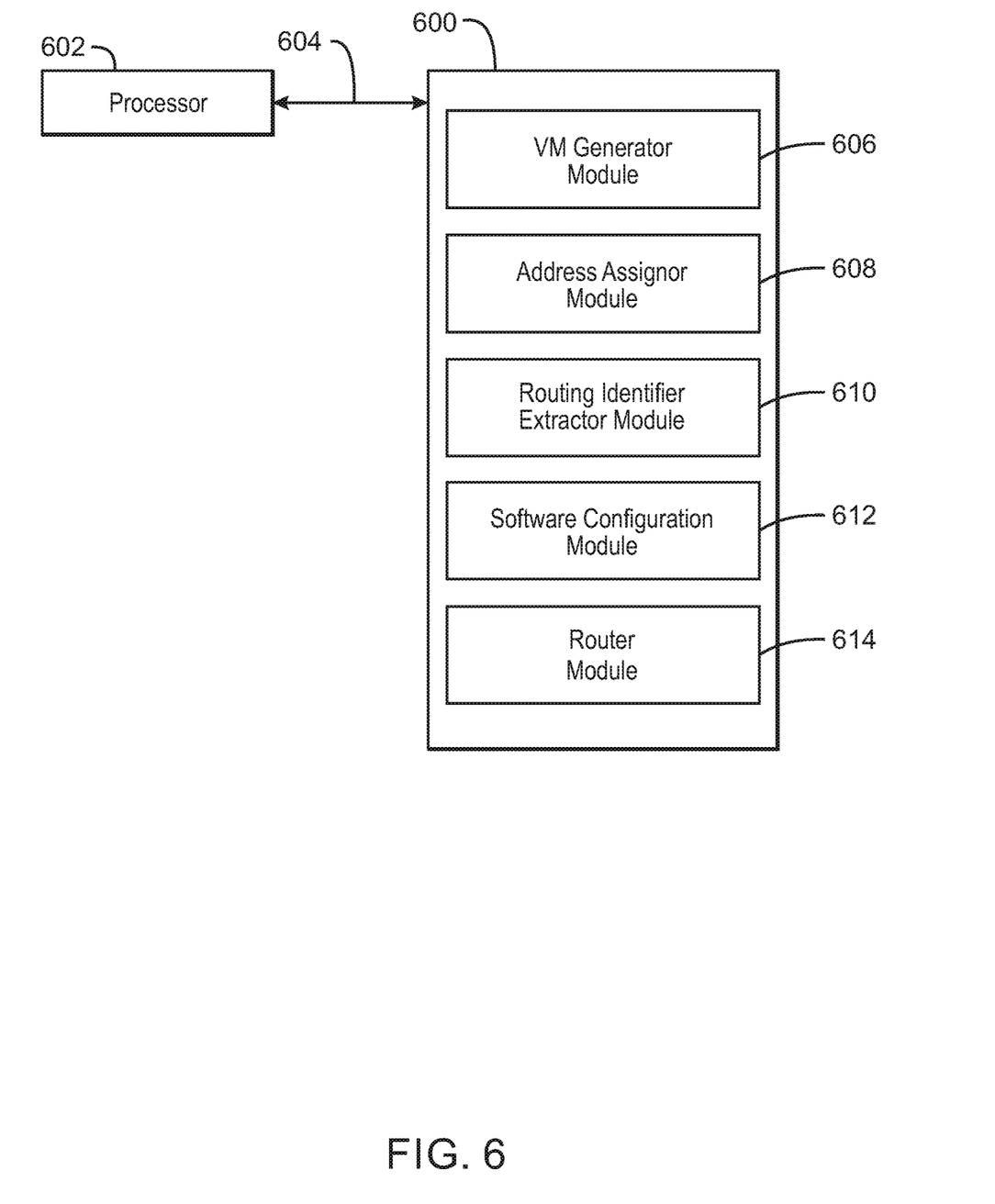
FIG. 6 is an example tangible, non-transitory computer-readable medium that can configure virtual machine instances using a one-to-one mapping.

Referring now to FIG. 6, a block diagram is depicted of an example tangible, non-transitory computer-readable medium 600 that can configure virtual machine instances using a one-to-one mapping. The tangible, non-transitory, computer-readable medium 600 may be accessed by a processor 602 over a computer interconnect 604. Furthermore, the tangible, non-transitory, computer-readable medium 600 may include code to direct the processor 602 to perform the operations of the method 200 of FIG. 2 above.

The various software components discussed herein may be stored on the tangible, non-transitory, computer-readable medium 600, as indicated in FIG. 6. For example, a virtual machine (VM) generator module 606 includes code to generate a virtual machine (VM) instance based on a received template. For example, the template may include one or more services to be run on the VM instance. The VM generator module 606 may further include code to connect the VM to a virtual network. For example, the virtual network may include a router and have an IP address. In some examples, the router may include a DHCP server and a static routing table. An address assignor module 608 includes code to assign the VM instance a MAC address from the pool of MAC addresses. The address assignor module 608 also includes code to assign an IP address based on the MAC address of the VM instance. For example, the address assignor module 608 may include code to modify a host file of the VM to map a host name of the VM to the assigned IP address. In some examples, the address assignor module 608 may be a start-up script to be included in a VM instance. In some examples, the IP address may be alternatively assigned by a DHCP server in response to a request by the VM instance upon booting up. A routing identifier extractor module 610 may include code to extract a routing identifier from the assigned IP address or the assigned MAC address. A software configuration module 612 may include code to configure software of the VM instance to receive data using a port number corresponding to the extracted routing identifier based on the one-to-one mapping. A router module 614 may include code to detect the assigned IP address as a destination for traffic based on a static routing table in response to receiving the traffic at an external IP address of the virtual network and forward the traffic to the VM instance. The static routing table may map routing identifiers to a pool of Internet Protocol (IP) addresses and a pool of media access control (MAC) addresses based on a one-to-one mapping. For example, the static routing table may be included in a DHCP server or a router. In some examples, the one-to-one mapping may be a predefined bitmask. For example, the bitmask may be used to define a static prefix and variable suffix for a pool of MAC addresses, a pool of corresponding IP addresses, and corresponding port numbers. The variable suffix may be a routing identifier. The bitmask may be used to predefine the pool of Internet Protocol (IP) addresses and the pool of media access control (MAC) addresses. The software configuration module 612 may also include code to configure software of the VM instance to send data using a port number corresponding to the extracted routing identifier based on the one-to-one mapping. The router module 614 may therefore also include code to replace the assigned IP address of the VM instance in outbound traffic with an external IP address of the virtual network in response to receiving the outbound traffic to be dispatched from the virtual network and dispatching the outbound traffic from a port on which the outbound traffic is received. It is to be understood that any number of additional software components not shown in FIG. 6 may be included within the tangible, non-transitory, computer-readable medium 600, depending on the particular application.

The flowchart and block diagrams in the Figures illustrate the architecture, functionality, and operation of possible implementations of systems, methods, and computer program products according to various embodiments of the present techniques. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 6 may be included within the tangible, non-transitory, computer-readable medium 600, depending on the specific application.

The descriptions of the various embodiments of the present techniques have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   generating, via the processor, a virtual machine (VM) instance based on a received template;
   assigning, via the processor, the VM instance a MAC address from a pool of MAC addresses;
   assigning, by a virtual machine manager running a start-up script, an IP address for the VM instance as part of an initialization process;
   extracting, via the processor, a routing identifier from the assigned IP address or the assigned MAC address;
   configuring, via the processor, software of the VM to receive data using a port number corresponding to the extracted routing identifier based on a one-to-one mapping;
   connecting the VM instance to a virtual network comprising a static routing table; and
   in response to receiving outbound traffic from the VM instance to be dispatched from the virtual network at a router, replacing the assigned IP address in the outbound traffic with an external IP address of the virtual network and dispatching the outbound traffic from a port on which the outbound traffic is received.

2. The computer-implemented method of claim 1, comprising, in response to receiving traffic at a common external IP address of the virtual network at a router, detecting the assigned IP address for the traffic based on the static routing table and forwarding the traffic to the VM instance.

3. The computer-implemented method of claim 1, wherein assigning the VM instance the IP address comprises modifying, via the processor, a host file of the VM comprising a mapping between a host name of the VM and the assigned IP address.

4. The computer-implemented method of claim 1, wherein assigning the VM instance the IP address is performed in response to detecting a lack of a marker, with the marker being a single packet of data that represents an indication that a networking of a VM instance has been configured.

5. The computer-implemented method of claim 1, comprising setting the marker indicating that networking of a VM instance has been configured in response to configuring the software of the VM, with the marker being a single packet of data that represents an indication that a networking of a VM instance has been configured.

6. A computer program product, the computer program product comprising a computer-readable storage medium having program code embodied therewith, wherein the computer readable storage medium is not a transitory signal per se, the program code executable by a processor to cause the processor to:
   generate a virtual machine (VM) instance based on a received template;
   assign the VM instance a MAC address from a pool of MAC addresses;
   assign, by a virtual machine manager running a start-up script, an IP address for the VM instance as part of an initialization process;
   extract a routing identifier from the assigned IP address or the assigned MAC address;
   configure software of the VM instance to receive data using a port number corresponding to the extracted routing identifier based on a one-to-one mapping;
   connect the VM to a virtual network; and
   replace the assigned IP address of the VM instance in outbound traffic with an external IP address of the virtual network in response to receiving the outbound traffic to be dispatched from the virtual network and dispatching the outbound traffic from a port on which the outbound traffic is received.

7. The computer program product of claim 6, further comprising program code executable by the processor to detect the assigned IP address as a destination for traffic based on a static routing table in response to receiving the traffic at an external IP address of the virtual network and forwarding the traffic to the VM instance.

8. The computer program product of claim 6, further comprising program code executable by the processor to modify a host file of the VM to map a host name of the VM to the assigned IP address.

9. The computer program product of claim 6, wherein the one-to-one mapping comprises a predefined bitmask used to predefine the pool of Internet Protocol (IP) addresses and the pool of media access control (MAC) addresses.

10. The computer program product of claim 6 further comprising the processor, where the computer program product is in the form of a computer system (CS).

11. The CS of claim 10, wherein the static routing table is generated via a script based on the one-to-one mapping.

12. The CS of claim 10, wherein the one-to-one mapping comprises a bitmask.

13. The CS of claim 10, further comprising connecting the VM instance to a virtual network, with the connection of the VM instance to the virtual network including a common external IP address and a router.

14. The CS of claim 13, wherein the virtual network comprises a Dynamic Host Configuration Protocol (DHCP) server to assign the VM instance the IP address.

15. The CS of claim 14, wherein the DHCP server comprises a static routing table to map routing identifiers to a pool of Internet Protocol (IP) addresses and a pool of media access control (MAC) addresses based on the one-to-one mapping.

* * * * *